United States Patent Office 2,759,949
Patented Aug. 21, 1956

2,759,949
3-AMINO-4-CYANOPYRAZOLE AND METHOD OF PREPARING

George H. Hitchings, Tuckahoe, and Elvira A. Falco, New Rochelle, N. Y., assignors to Burroughs Wellcome & Co. (U. S. A.) Inc., Tuckahoe, N. Y., a corporation of New York No Drawing. Application October 27, 1955, Serial No. 543,246

2 Claims. (Cl. 260—310)

The present invention relates to a new compound 3-amino-4-cyanopyrazole, which is a useful and valuable intermediate in the preparation of new pyrazoles and also for the manufacture of the important pyrazolo (3,4-d) pyrimidines. Pyrazolopyrimidines are inhibitors of cell division, probably as purine antagonists. These pyrazolopyrimidines are prepared from the present amino cyano pyrazole by heating the latter with urea, thiourea or formamide in accord with the following reactions:

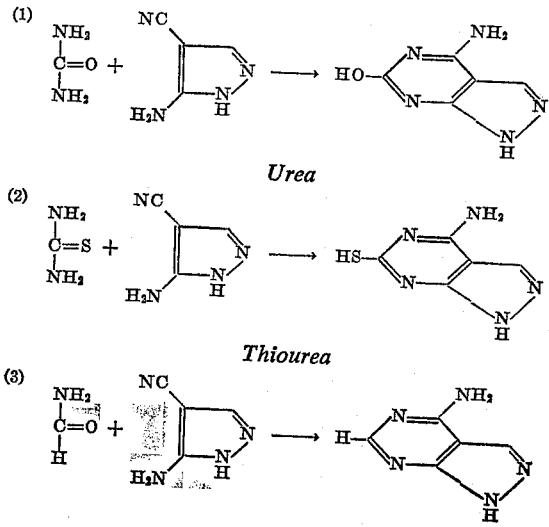

Formamide

In accordance with the invention, the new compound is conveniently prepared by the reaction of ethoxymethylene malononitrile with hydrazine, as shown in the equation below:

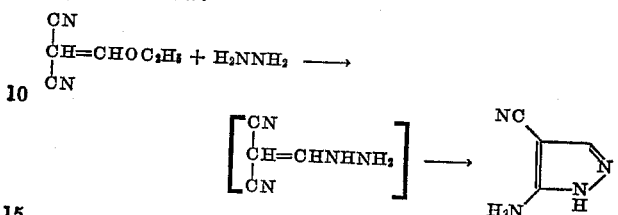

The aminocyanopyrazole, so formed, can be used as an intermediate for the synthesis of pyrazoles, and, by reaction with reagents such as formamide and urea, of various pyrazolo (3,4-d) pyrimidines.

Method of preparation

A. Ethoxymethylene malononitrile (5 g.) and hydrazine 5.2 g. were mixed. After the addition of 50 ml. of absolute ethanol, the solution was heated on the steam bath for one hour and evaporated to dryness. The residue was extracted with alcohol and recrystallized from hot water.

B. Ethoxymethylene malononitrile (20 g.) and hydrazine 5.2 g. were mixed as before, 50 ml. of ethanol added, and the mixture heated under a reflux condenser overnight. The product was worked up as before, and after recrystallization, melted at 172°.

C. Ethoxymethylene malononitrile (20 g.) was added in portions to 15 ml. of 85% hydrazine hydrate in water. After the addition of 100 ml. of ethanol, the mixture was heated for two hours on the steam bath and then evaporated to dryness. The residue was extracted with cold water, and the solid was then recrystallized from hot water.

What we claim is:
1. As a new compound, 3-amino-4-cyanopyrazole.
2. The method of making 3-amino-4-cyanopyrazole which comprises reacting ethoxymethylene malononitrile with hydrazine.

No references cited.